April 28, 1953 J. E. SOCKE 2,636,592
MACHINE FOR FEEDING AND POSITIONING CONTAINERS
IN A DESIRED PATTERN ARRANGEMENT
Filed April 29, 1948 4 Sheets-Sheet 1

INVENTOR.
JOHN E. SOCKE
BY
ATTORNEYS

April 28, 1953

J. E. SOCKE 2,636,592

MACHINE FOR FEEDING AND POSITIONING CONTAINERS
IN A DESIRED PATTERN ARRANGEMENT

Filed April 29, 1948

INVENTOR.
JOHN E. SOCKE

BY

ATTORNEYS

April 28, 1953 J. E. SOCKE 2,636,592
MACHINE FOR FEEDING AND POSITIONING CONTAINERS
IN A DESIRED PATTERN ARRANGEMENT
Filed April 29, 1948 4 Sheets-Sheet 4

INVENTOR.
JOHN E. SOCKE
BY
ATTORNEYS

Patented Apr. 28, 1953

2,636,592

UNITED STATES PATENT OFFICE 2,636,592

MACHINE FOR FEEDING AND POSITIONING CONTAINERS IN A DESIRED PATTERN ARRANGEMENT

John E. Socke, Pelham Manor, N. Y., assignor to American Can Company, New York, N. Y., a corporation of New Jersey Application April 29, 1948, Serial No. 23,926

9 Claims. (Cl. 198—31)

This invention relates to a machine for feeding and positioning containers or cans and other articles in a predetermined arrangement and has particular reference to feeding containers from different sources or runways for depositing them in rows onto a conveyor to assemble them in a desired pattern arrangement in preparation for subsequent handling and treatment. This is a companion application to my copending United States application, Serial Number 36,175, filed June 30, 1948, on Machine for Feeding, Transferring and Compacting Articles into a Unit Layer.

An object of the invention is the provision of a machine for feeding containers or other articles from one or more runways onto an intermittently operated conveyor in such a manner as to deposit rows of containers on the conveyor to form a unit layer of containers having a layout of a desired pattern relation.

Another object is the provision in a machine of the character described of different supply sources or runways for feeding containers from several directions to deposit rows of containers transversely onto a conveyor to stagger the latter rows of containers and to form the rows into a unit layer.

Another object of the invention is the provision in such a machine, of devices for intermittently moving the conveyor a predetermined distance when the desired number of containers in a row have been deposited on the conveyor and for stopping the operation of the conveyor when sufficient rows of containers complete a unit layer.

Numerous other objects and advantages of the invention will be apparent as it is better understood from the following description, which, taken in connection with the accompanying drawings, discloses a preferred embodiment thereof.

Referring to the drawings.

As an exemplary embodiment of the present invention the drawings illustrate a machine in which cylindrical sheet metal cans A are fed continuously from different sources or runways B to deposit a plurality of rows of cans in straight lines transversely of the machine into can dividers or elongated loading pockets or troughs C to arrange the cans in parallel and staggered relation. The invention is equally well adapted to fibre containers or other articles. The elongated pockets C are carried on a conveyor D which advances the groups or rows of cans intermittently along a predetermined path of travel until a desired number of such rows of cans are assembled to complete a unit layer. The operation of the machine is then stopped until the layer of cans has been removed as a unit from the pockets. This removal of the cans may be effected in any suitable manner.

Figure 1:
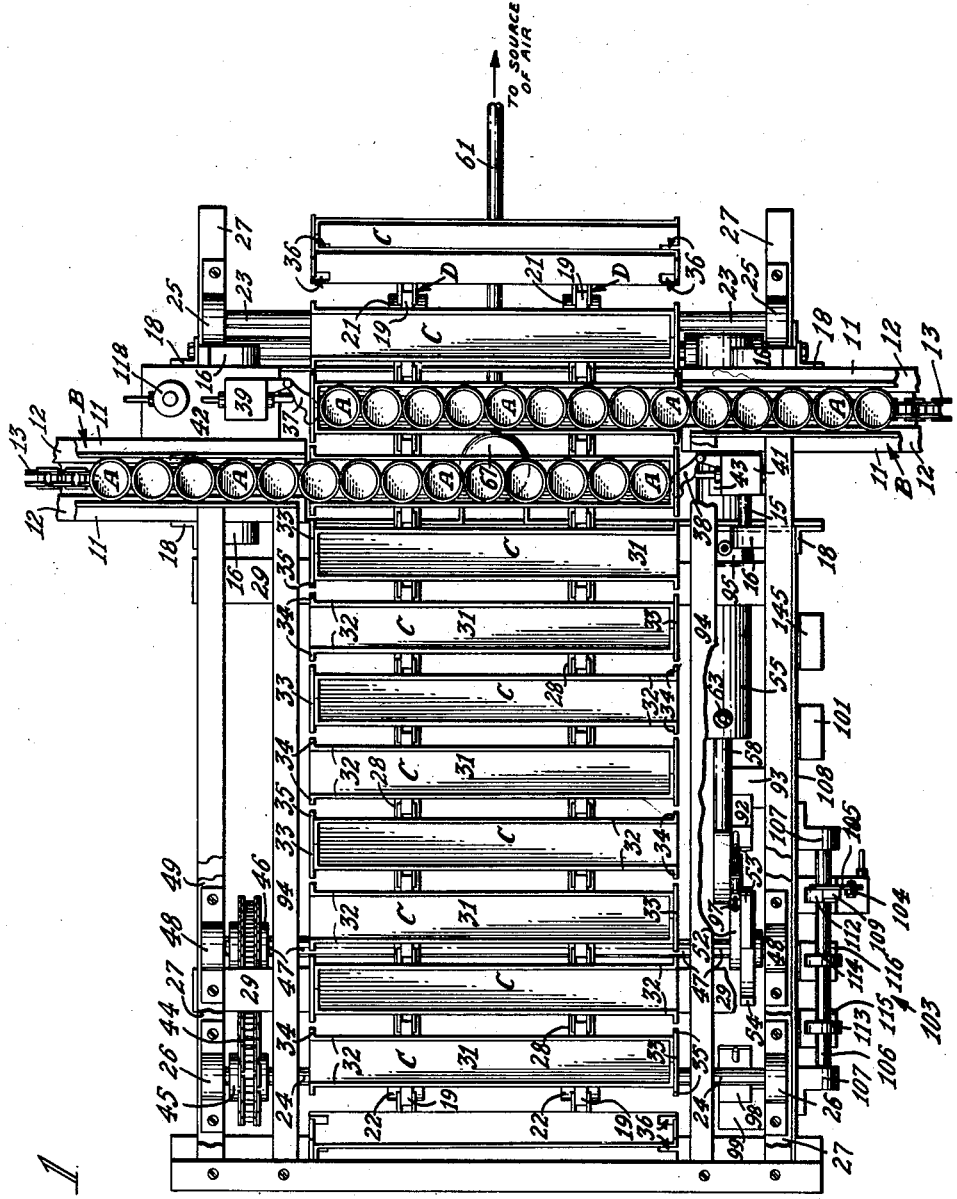
Figure 1 is a top plan view of a machine embodying the present invention with parts broken away.
Figure 3:
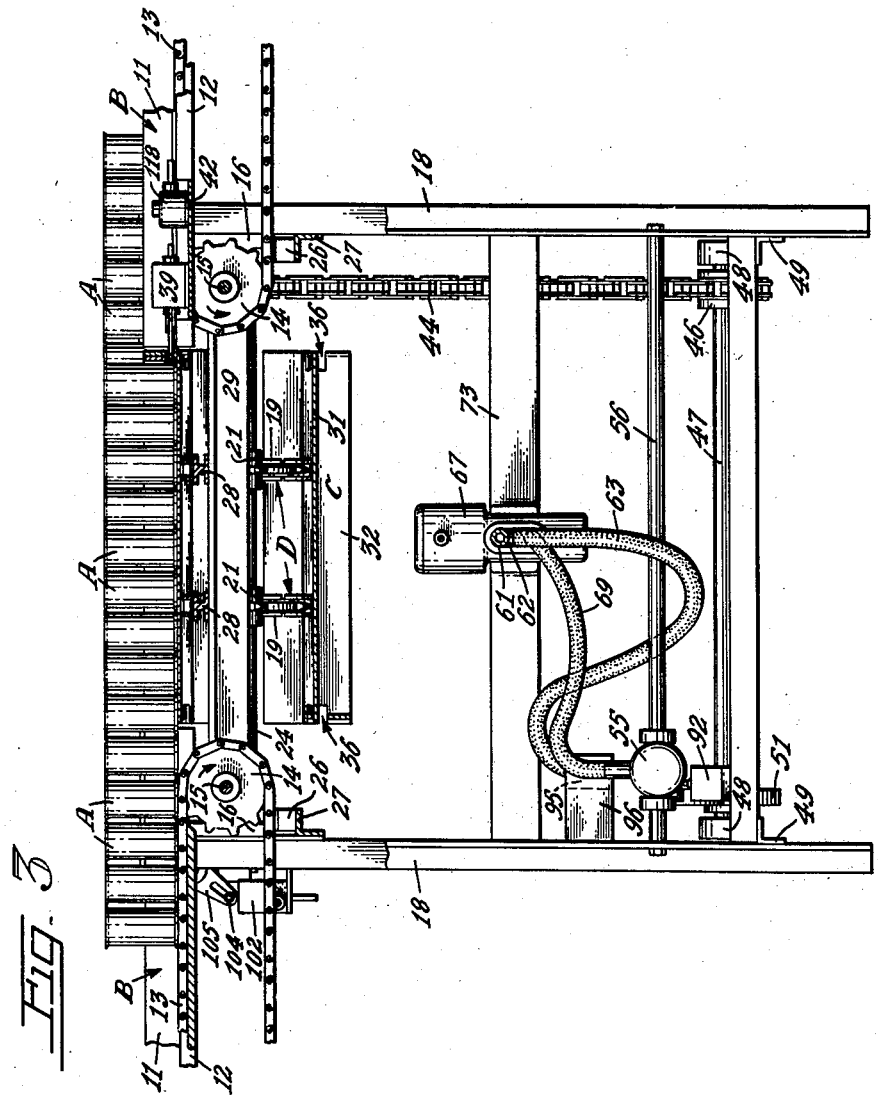
Fig. 3 is a transverse sectional view taken substantially along the broken line 3—3 in Fig. 2, with parts broken away.

In the exemplary embodiment shown the cans to be arranged in a layer are received in processional order moving in straight lines along a pair of runways B located one on each side of the machine in offset and parallel relation and at right angles to the path of travel of the conveyor D (Figs. 1 and 3). The runways B are open at their inner ends so that the moving cans A may enter the respective can dividers or pockets C as the latter are moved into registration with the runways.

Each of the runways B include spaced upper and lower angle irons 11, 12 which serve as side and bottom guide rails. The cans are in an upright position and are supported on continuously moving chain conveyors 13 which are disposed between the angle irons 12. The chains carry the cans A into the elongated can supports C of the machine from opposite sides thereof.

Figure 2:
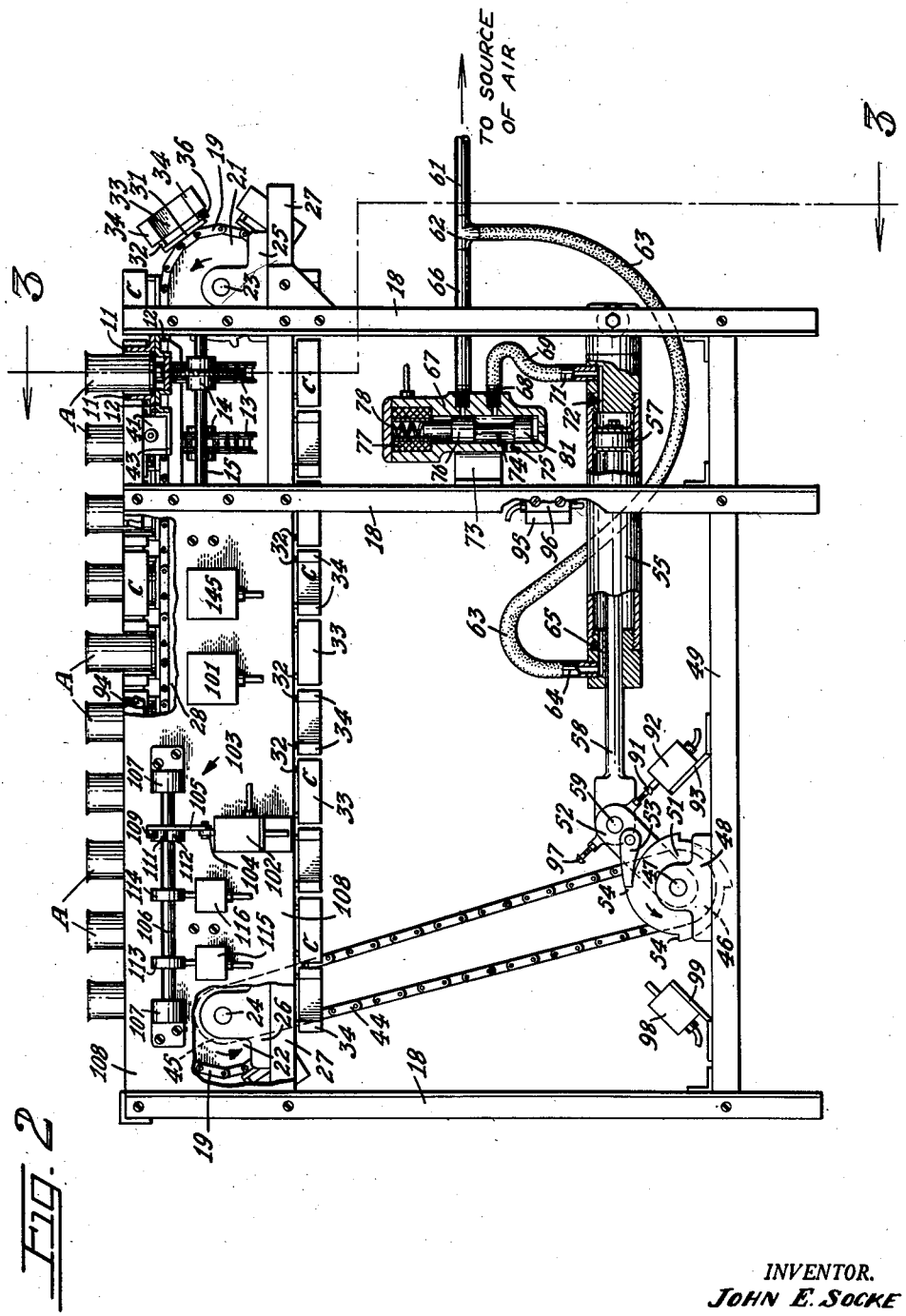
Fig. 2 is a side elevation of the machine shown in Fig. 1, with parts broken away and with parts in section.

The chain conveyors 13 are operated continuously and at the same speed in any suitable manner. The chains 13 operate over sprockets 14 which are mounted on shafts 15. There is one of these sprockets 14 and shafts 15 on each side of the machine (Figs. 2 and 3). The shafts 15 are journaled in bearings 16 secured to spaced vertical angle irons 18 which are secured to other angle irons, which taken collectively form the main frame of the machine.

The conveyor D which carries the can pockets or troughs C includes a pair of spaced endless chains 19 which pass over pairs of chain sprockets 21, 22 located at opposite ends of the machine (Figs. 1 and 2). Sprockets 21, 22 are mounted on respective cross shafts 23, 24 journaled in bearings 25, 26 secured to horizontally disposed side angle irons 27 of the main frame (Fig. 2).

The endless chains 19 of the conveyor D are supported along their upper run or path of travel by spaced horizontal rails 28 (Figs. 1, 2 and 3) carried on spaced cross bars 29 secured to the opposite sides of the machine main frame.

Each of the can loading pockets C is rectangular and elongated in shape and is of sufficient dimensions to hold a full row of cans A. In the instant case, by way of example, the pocket is designed to hold nine cans. Alternate pockets are arranged to offset rows of cans transversely of the machine, so that the received cans in adjacent rows are arranged in staggered relation as shown in Fig. 1.

The receiving end of each pocket C is open for the reception of the cans from the runways and for this purpose are alternately arranged on the conveyor D. Each pocket C is formed with a bottom wall 31, retaining parallel side walls 32 and an end wall 33. The side walls 32 at each open end are bent outwardly to provide flanges 34. The end wall 33 of each pocket C is extended outward beyond the side walls 32 and form flanges 35. Flanges 34, 35 of adjacent pockets serve as side guides between the respective pockets C to hold back the cans in the runways B against advancement when the pockets C are advanced by the conveyor past the open ends of the runways.

The side walls 32 at the opposite or forward article receiving ends of each pocket C are cut away at 36 adjacent the bottom wall 31 so that pocket loading detector levers 37, 38 may enter the closed ends of each pocket C to engage the leading can in a row of cans entering such a pocket as pairs of the pockets C are brought into registration with the pair of runways B. The levers 37, 38 are pivotally carried on normally open electric switches 39, 41 disposed on opposite sides of the conveyor D (Fig. 1) and mounted on brackets 42, 43 secured to the main frame.

The levers 37, 38 are designed to actuate the switches 39, 41 through a small angular movement, under a light pressure, while at the same time having a large over-travel which permits a projecting can in an adjacent pocket to pass by. The switches 39, 41 are connected in series in an electrical circuit with other electric apparatus and will be described hereinafter more fully.

The conveyor D is operated intermittently by an endless drive chain 44 (Figs. 1, 2 and 3) which passes over a sprocket 45 secured to the conveyor shaft 24 and over a drive sprocket 46 which is mounted on a drive shaft 47. The shaft 47 is journaled in bearings 48 secured to horizontally disposed side angle irons 49 of the main frame.

The shaft 47 is operated intermittently by a ratchet wheel 51 mounted on this shaft. The ratchet wheel is rotated by an arm 52 which is loosely mounted on the shaft 47. The outer end of the arm carries a pawl 53 which engages with one of four teeth 54 of the ratchet wheel 51 (Fig. 2).

The arm 52 is shifted or rocked through an outward or can pocket advancing stroke (to the left in Fig. 2) and thence through an inward, or return stroke by an air actuated cylinder 55 which is pivotally mounted on a cross bar 56 secured to the main frame (Figs. 2 and 3). The air cylinder 55 is provided with a piston 57 which is secured on a piston rod 58 which extends beyond the inner end of the cylinder. This end of the piston rod is connected pivotally by a pin 59 to the arm 52.

The piston 57 is reciprocated within the cylinder by compressed air acting against one or both of its faces. For this purpose compressed air is continuously introduced into the inner end of the cylinder from a main pipe line 61 leading from any suitable source of compressed air, through a pipe fitting 62, a flexible tube 63, a pipe nipple 64, and an inlet opening 65 in the cylinder adjacent its inner end. Compressed air under the same pressure also is introduced, periodically, into the outer end of the cylinder by means of a pipe 66 connected to the pipe fitting 62 and to an air valve 67 which also is connected through a pipe nipple 68, a flexible tube 69, a pipe nipple 71 and an inlet opening 72 in the cylinder adjacent its outer end.

The valve 67 is located above the air cylinder and is secured to a transverse beam 73 mounted on two of the vertical angle irons 18 of the main frame. Valve 67 is formed with an air channel 74 which communicates with inlet openings in the inner ends of the pipe 66 and the pipe nipple 68. The channel also communicates with a vent opening 75 formed in the valve housing. The channel 74 normally is closed to the supply of air by a slide valve 76 which extends over and seals off the inlet opening of the pipe 66.

Figure 4:
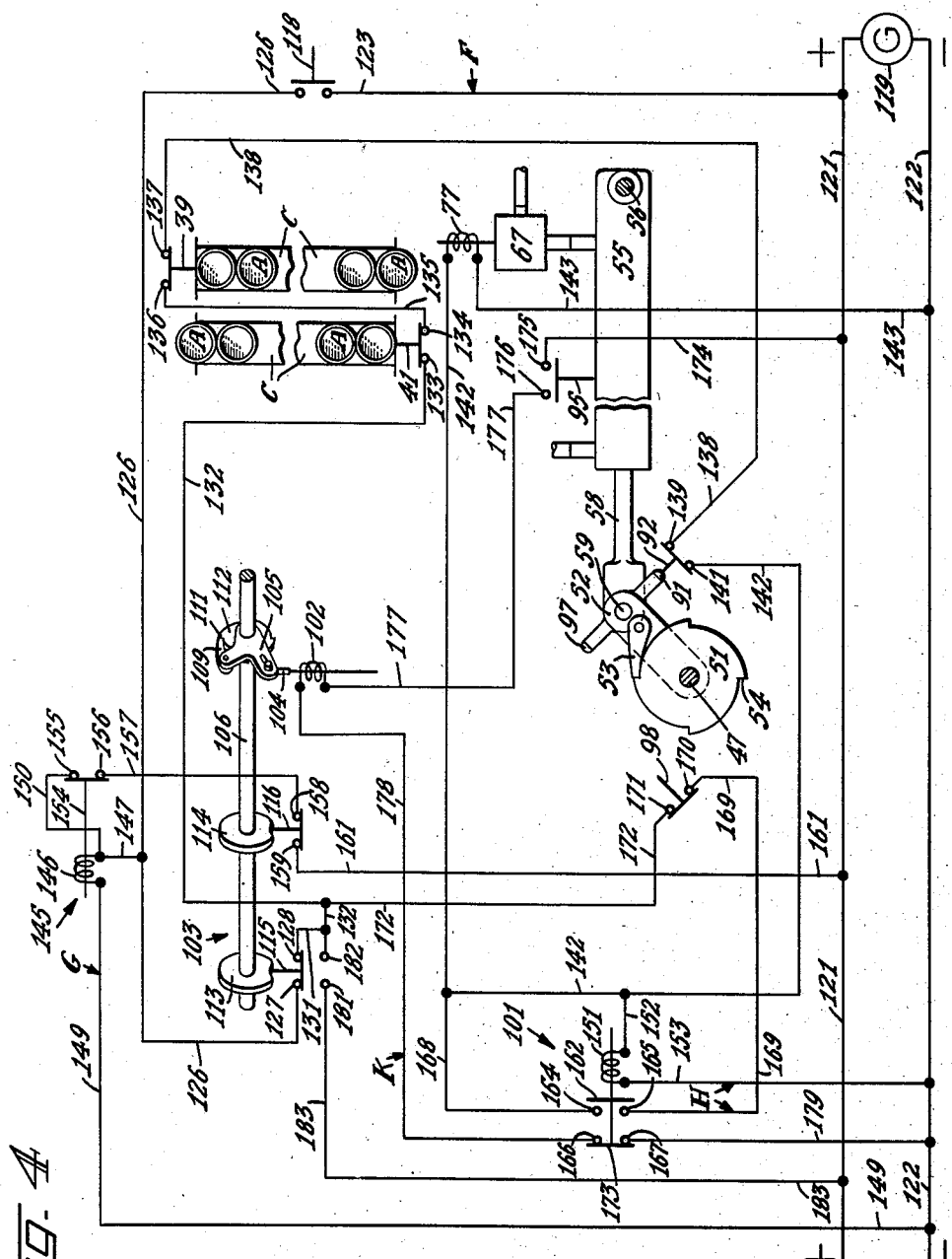
Fig. 4 is a combined schematic view of the mechanical control parts of the machine and a wiring diagram of the electric control system used in the machine.

The upper end of the slide valve 76 is formed with a solenoid core which is movable in an electric solenoid 77 which effects the movement of the slide valve. This solenoid is normally de-energized and also is included in the circuit shown in the wiring diagram (Fig. 4). A compression spring 78 housed within the solenoid 77 presses against its core and thus keeps the slide valve 76 in closed position when the solenoid is thus normally held de-energized.

Hence, compressed air continuously admitted into the inner end of the cylinder 55 acts against the inner face of the piston 57 to keep the arm 52 in its normally retracted position (which is to the right as viewed in Fig. 2). In this position an adjustable stop 91, secured to the arm 52, engages against a normally open switch 92 which is mounted on a bracket 93, secured to the angle iron 49 of the main frame. The engagement of the switch 92 by said stop 91 effects the closing thereof in which condition it is held while the arm 52 is in its retracted position. The switch 92 is connected in the electrical circuit (Fig. 4) and will be described fully hereinafter.

Compressed air is admitted to the outer end of the cylinder 55 to start the operation of the air cylinder and to shift the arm 52 through an advancing stroke. This is effected by energizing the valve solenoid 77 which moves the slide valve 76 to an open position in the housing channel 74 and also closes the vent opening 75 by moving a cut off member 81 into sealing position against the opening. The member 81 is formed on the slide valve 76 and moves with it. This movement of the slide valve permits air to flow from the pipe 66 through the valve housing, the pipe nipple 68, the flexible connector 69, the pipe nipple 71 and the inlet opening 72 into the outer end of the cylinder 55.

The air thus admitted, acts against the outer face of the piston. The area of this outer face is greater than that of its inner face by the amount equal to the cross sectional area of the piston rod. Therefore, the force acting against the outer face is greater than that against the inner face and thus the piston is moved outwardly from cylinder 55, or toward the left as viewed in Fig. 2. This movement of the piston shifts the arm 52 through a forward advancing stroke.

During this outward movement of the piston 57, the pawl 53 carried on the moving arm 52 and engaging against a tooth 54 of the ratchet wheel (Fig. 2), actuates the latter through 90 degrees of its rotation, thereby effecting the operation of the drive chain 44 in advancing the conveyor D a distance equal to two can pockets or troughs C. The two filled pockets in registration with the runways B thus are advanced to the left as viewed in Fig. 1 and the next two adjacent pockets are moved into registration with the runways B for the loading of another two rows of cans therein.

The rows of cans A within the loaded pockets C are retained therein during the advancement of the conveyor D (Fig. 1) by side guides 94 disposed at the ends of the pockets and extending longitudinally of the machine. These guides are formed of angle iron and are secured in any suitable manner to the main frame.

During the shifting of the arm 52 as through a pocket advancing stroke and again through a retracting stroke, the outer end of the piston rod 58 traverses an arcuate path thus causing the air cylinder 55 to swing upwardly on its pivotal connection for each stroke and engage against a normally open electric switch 95. The switch is mounted above the air cylinder 55 (Fig. 2) on a bracket 96 secured to one of the vertical angle irons 18 of the main frame. Switch 95 is connected in the electrical circuit (Fig. 4) and will be described fully hereinafter.

As the piston rod 58 reaches the end of the pocket advancing stroke an adjustable stop 97 similar to stop 91 and also secured to the arm 52, engages against a normally closed electric switch 98 which is mounted on a bracket 99 secured to the angle iron 49 of the main frame (Fig. 2). The engagement of this switch breaks an electric circuit to the solenoid 77 hereinbefore described and de-energizes the solenoid. The spring 78 of the air valve 67 immediately shifts the slide valve 76 into closed position and thus cuts off the flow of air into the outer end of the cylinder 55. This action also opens the vent opening 75 and thus releases the air in this end of the cylinder to the atmosphere.

Hence, the air constantly forced into the inner end of the cylinder 55 through tube 63, returns the piston 57 and the arm 52 to their original retracted position (see Fig. 2). Upon reaching this latter position the stop 91 again engages the switch 92 and closes it as previously described in readiness for the next pocket advancing stroke.

During the retracting stroke of the piston rod, as in the advancing stroke previously described, the air cylinder 55 swings up and engages the switch 95 and closes it momentarily. The closing of this switch however is effective in one direction only and that is on the retracting or return stroke. During this return stroke of the piston rod a circuit is established through a relay 101 to energize a solenoid 102 of a timing device 103 for repeating successive pocket advancing strokes until four such strokes have been made. This constitutes a cycle of operation. During this cycle of operation eight rows of cans in pockets C have been assembled on the conveyor to form a unit layer of cans.

The timing device 103, including the relay 101 is mounted on the side of the machine (Fig. 2). The solenoid 102 carries and actuates a movable core 104 which is connected at its outer end to an arm of a bell crank 105 (see Fig. 4) loosely mounted on a shaft 106 carried in bearing brackets 107 secured to a panel 108 of the main frame. The crank 105 carries a pawl 109 which engages with teeth 111 of a ratchet wheel 112 mounted on the shaft 106. This ratchet wheel like ratchet wheel 51 also has four teeth.

The timing device 103 also includes a pair of cams 113, 114 which are secured to the shaft 106 and which actuate switches 115, 116 connected in the electrical circuits (Fig. 4). These latter switches, together with the relay 101 and the solenoid 102 will be described fully hereinafter.

Hence, when the solenoid 102 is energized during the return stroke of the piston following its initial pocket advancing stroke, it rocks the crank 105, and the pawl 109 carried thereon turns the ratchet wheel 112 through a partial rotation of 90 degrees. This movement of the ratchet wheel effects a corresponding partial rotation of the cams 113, 114. In this manner the cams are rotated intermittently at the rate of one full revolution for every four partial rotations of the ratchet wheels 51, 112. The timing switches 115, 116 are thus actuated by said cams during the return of the initial stroke and again following the fourth retracting stroke thus completing the cycle of operation, at which time the machine is stopped. The assembled layer or tier of cans thereafter is lifted or removed from the pockets C in any suitable manner to position the complete layer of cans in any convenient place of deposit. The machine thereafter is restarted manually and the cycle of operation repeated for arranging a subsequent layer or layers of cans A.

Reference should now be had to the wiring diagram in Fig. 4 which schematically shows electric equipment for controlling and operating the various solenoids and switches hereinbefore mentioned. The cycle of operation of the machine is started by momentarily closing a manually operated and normally open starting switch 118 for energizing an electrical starting circuit F which includes the starting switch, the two switches 39, 41 which are closed by the incoming cans and the solenoid 77. This circuit is effective for starting the actuation of the piston 57 in the air cylinder 55 on an initial pocket advancing stroke. The switch 118 is mounted in a convenient location on the bracket 42 on top of the machine (Fig. 1).

The circuit F as well as all the other circuits to be hereinafter described receive electric current from a generator circuit which includes a generator 119 having a main lead wire 121 and a return lead wire 122. In the circuit F one side of the switch 118 is connected by a wire 123 to the generator lead wire 121. The opposite side of the switch 118 is connected by a wire 126 to a contact 127 of the switch 115 of the timing device 103. Fig. 4 of the drawings illustrate the cams 113, 114 of the timing device in a starting position at which time movable elements of switches 115, 116 are located in indents formed in the cams which permit closing of the switches for starting the machine.

The switch 115 while in this closed position also engages a contact 128 which is connected by a wire 131 to a wire 132 leading to and connected with a contact 133 of the switch 41. Another contact 134 of the switch 41 is connected by a wire 135 to a contact 136 of the switch 39. Switches 41, 39 are closed momentarily by the leading can A in each filled pocket C (Fig. 1) engaging against the switch actuating levers 37, 38 as previously described, which is necessary for starting the machine.

The switch 39 while in its closed position also engages a contact 137 which is connected by a wire 138 to a contact 139 of the switch 92. This switch 92 also is in a closed position momentarily where it is held by the arm 52 while it is in its retracted position as previously described, as an incident to starting the piston on its initial pocket advancing stroke.

Switch 92 while in its closed position also engages a contact 141 which is connected by a wire 142 to one side of the air valve solenoid 77. Solenoid 77 also is connected by a wire 143 to the return lead wire 122. This completes the electric circuit F.

Hence, when the switch 118 is closed, electric current from the main lead wire 121 passes along this circuit and energizes the solenoid 77. Energizing of the solenoid 77 operates the air valve 67 as previously described, admitting compressed air into the outer end of the air cylinder 55 for effecting the actuation of the piston 57 on an initial pocket advancing stroke. Since the closing of the switch 118 is of momentary duration a hold circuit G is provided which immediately cuts out the switch 118 and holds the solenoid 77 energized until the air piston 57 actually starts moving.

The holding circuit G includes a relay 145 having a solenoid 146 one side of which is connected by a wire 147 to the wire 126 of the circuit F. The other side of the solenoid 146 is connected by a wire 149 to the return lead wire 122. Relay 145 is secured to the panel 108 on the side of the machine adjacent the relay 101. Electric current passing along the wire 126 of the circuit F at the time the switch 118 is closed also passes through the relay circuit G along the wire 147, through the solenoid 146 energizing it and thence returning by way of the wire 149 to the return lead wire 122.

Energizing of the relay solenoid 146 actuates a movable relay switch 154 which closes against switch contacts 155, 156. Contact 155 is connected by a wire 150 to the wire 147. The other contact 156 is connected by a wire 157 to a contact 158 of the closed switch 116. Another contact 159 of the switch 116 is connected by a wire 161 to the main lead wire 121.

Hence when the switch 118 is opened electric current from the generator lead wire 121 flows along wire 161, through the closed switch 116, along wire 157, closed switch 154, wires 150, 147, 126, closed switch 115, wires 131, 132, closed switch 41, wire 135, closed switch 39, wire 133, closed switch 92, wire 142, and solenoid 77, returning by way of the wire 143 to the generator lead wire 122.

As soon as the piston 57 starts moving, the filled can pockets of the conveyor move away from the switches 39, 41 and the ratchet arm 52 moves away from the switch 92. Thus these switches 39, 41, 92 immediately open. However provision is made through an auxiliary holding circuit H, which cuts out these switches, so as to hold the solenoid 77 energized so that the piston 57 may continue its advancement uninterruptedly.

The auxiliary holding circuit H includes the relay 101 which is provided with a solenoid 151 one side of which is connected by a wire 152 to the wire 142 of the circuit F. The other side of the solenoid 151 is connected by a wire 153 to the return lead wire 122. Electric current passing along the wire 142 of the circuit F at the time the starting switch 118 is closed also passes along this holding circuit along the wire 152, through the solenoid 151, and thence returns by way of the wire 153 to the generator return wire 122. This current energizes the solenoid 151.

Energizing of the relay solenoid 151 immediately closes a switch 162 against a pair of contacts 164, 165. Contact 164 is connected by a wire 168 to the wire 142 of the operating circuit F. The other contact 165 is connected by a wire 169 to a contact 170 of the closed switch 98. Another contact 171 of the switch 98 is connected by a wire 172 to the wire 132 of the circuit F.

Hence electric current from the generator lead wire 121 thus passes along the wire 161, through the closed switch 116, along the wire 157, through the closed relay switch 154, along the wires 150, 147 and 126, through the closed switch 115, along the wires 131, 132, 172, through the closed switch 98, along the wire 169, through the closed switch 162, along the wires 168 and 142 to the solenoid 77 and thence by way of the wire 143 to the return lead wire 122. Thus the solenoid is maintained energized while the piston 57 is traveling forward and while the switches 39, 41 and 92 are open.

As the piston 57 reaches the end of its initial pocket advancing stroke, the stop 97 engages against the normally closed switch 98 and opens it. This deenergizes the solenoids 77, 146, 151 and opens the switches 154, 162 and thus breaks the operating circuit F, the holding circuit G, and the auxiliary holding circuit H. The advancement of the conveyor 19 is thus stopped momentarily while the piston 57 moves back through a return stroke to its retracted position. The two filled pockets C on the conveyor (Fig. 1) have thus been advanced along their path of travel and the next two pockets C moved into position for filling with rows of cans as previously described.

De-energizing the air valve solenoid 77 allows the spring 78 in the valve to return the slide valve to its closed position shutting off the supply of air to the outer end of the air cylinder and venting it as previously described, thus permitting the supply of air continuously admitted to the inner end to effect the return stroke of the piston.

De-energizing of the solenoid 151 of the auxiliary holding circuit H prepares for establishment a timing circuit K which includes the timing switch 95 and a switch 173 which is formed as a part of the switch 162 and which closes against a pair of contacts 166, 167 when the switch 162 opens. In this timing circuit K a wire 174 connects the main lead wire 121 with a contact 175 of the normally open switch 95. Another contact 176 of the switch 95 is connected by a wire 177 to one side of the timing solenoid 102. The opposite side of this solenoid is connected by a wire 178 to the contact 166 of the switch 173. The opposite contact 167 of this switch is connected by a wire 179 to the return lead wire 122.

The circuit K is established momentarily during the return stroke of the piston 57 as the air cylinder 55 swings up and closes the switch 95 as hereinbefore described. When the switches 95 and 173 are closed electric current from the main lead wire 121 passes along the wire 174, through the switch 95, along the wire 177, through the solenoid 102, along the wire 178, through the switch element 173 and thence by way of the wire 179 to the return lead wire 122. This energizes the solenoid 102.

Energizing of the solenoid 102 actuates the timing device 103 as hereinbefore described including the partial rotation of the cams 113, 114 to effect opening of the switches 115 and 116 from their closed positions with the respective contacts 127, 128 and 158, 159. Switch 115 is a two-way switch and upon moving away from its contacts 127, 128 as just described, it immediately engages a second pair of contacts 131, 132 which are utilized in re-establishing a modified operating circuit F to re-energize the air valve solenoid 77 to effect a repeat operation of the conveyor 19. In this modified circuit the contacts 181, 182 of this switch 115 connects the wire 132 of the circuit F with a wire 183 which is connected with the main lead wire 121. Actuation of the timing device 103 as just described thus breaks the holding circuit G and by-passes the relay 145 which thereafter lays idle for the next three successive strokes while completing the cycle of operation.

Hence, upon the return of the piston 57 for the next pocket advancing stroke, it recloses the switch 92 and with this switch closed and the switches 41, 39 closed by the leading cans in the rows of cans fed into the pockets C, the modified circuit F is established without the aid of the starting switch 118. In this modified operating circuit electric current from the main lead wire 121 passes along the wire 183, through the switch 115 closed against its contacts 181, 182, along the wire 132, through the closed switch 41, along the wire 135, through the closed switch 39, along the wire 138, through the closed switch 92, along the wire 142, through the solenoid 77 and returning by way of the wire 143 to the return lead wire 122. This re-energizes the solenoid 77.

Electric current flowing along the wire 142 simultaneously re-establishes the auxiliary holding circuit H hereinbefore described by also passing from the wire 142 along the wire 152, through the solenoid 151 returning by way of the wire 153 to the return lead wire 122. This energizes the solenoid 151 and closes the switch 162 against its contacts 164, 165 and opens the switch 173 thus breaking the circuit K. As the piston 57 starts moving on its forward stroke and the switches 41, 39 and 92 open, the solenoid 77 will be kept energized by the auxiliary holding circuit H so that the piston will continue its movement.

Electric current from the main lead wire 121 passing along the wire 183, through the switch 115 and along the wire 132, will then pass along the wire 172, through the closed switch 98, along the wire 169, through the closed switch 162, along the wires 168 and 142, through the solenoid 77 for maintaining it energized and returning by way of the wire 143 to the return lead wire 122.

When the piston 57 reaches the end of its second pocket advancing stroke, the stop 97 again engages against the switch 98 to open it. This breaks the holding circuit and de-energizes the solenoids 77 and 151. The switch 162 thereupon opens and the switch 173 closes against its contacts 166, 167 and re-establishes the timing circuit K so that the solenoid 102 may again be actuated by the reclosing of the timing switch 95 on the piston retracting stroke as hereinbefore described.

The operations of the electrical apparatus in the circuits just described function in the same manner for the third and fourth pocket advancing strokes and also for the return of the piston following these strokes. During the return of the piston 57 following its fourth and final pocket advancing stroke for completing the cycle of operation, the timing device 103 is actuated once again by energizing the timing circuit K as previously described to restore the switches 115, and 116 to their initial starting condition.

Hence, as the cams 113, 114 come to rest on the last quarter of their rotation the movable elements of the switches 115, 116 return into the indents formed in these cams. The switches 115, 116 thereupon engage their respective contacts 127, 128 and 158, 159 thus preparing the starting circuit F through the wires 126, 131 and the holding circuit G through the wires 157, 161 so that upon removal of the assembled tier or layer of cans, a new cycle of operation may be repeated by closing of the manually operated switch 118 for the starting of the machine as previously described.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a machine for feeding articles such as containers or the like and for grouping them in a layer unit of a desired pattern, the combination of a container runway for guiding a continuous supply of containers into the machine, an intermittently operable conveyor adjacent said runway for receiving successive single rows of containers therefrom, normally inactive means for moving said conveyor, electric control means energized by the leading container in a row of containers received on said conveyor for intermittently actuating said conveyor moving means for periodically advancing said conveyor and actuated by said conveyor moving means in a step-by-step manner past said runway to form a layer of containers on said conveyor, and timing means operable during the intermittent advancement of the conveyor and actuated by said conveyor moving means for stopping the operation of said conveyor when a desired number of rows of containers are received on said conveyor to form a said layer unit thereon.

2. In a machine for feeding articles such as containers or the like and for grouping them in a layer formation, the combination of a pair of container runways for guiding the containers from opposite directions along straight line paths of travel into the machine, an intermittently operable conveyor disposed adjacent said runways, elongated pockets carried on said conveyor for receiving rows of containers from said runways, means for intermittently moving said conveyor to progressively advance successively received rows of containers in said pockets to form said layer of containers on said conveyor, means actuated by a container in said conveyor pocket for initiating an advancement of said conveyor by its said moving means, when rows of containers fed from said runways fill two adjacent conveyor pockets, and means actuated by said conveyor moving means for stopping further intermittent advancement of the conveyor following the formation of a said layer thereon.

3. In a machine for feeding articles such as containers or the like and for grouping them in a layer having a staggered arrangement, the combination of a pair of container runways for guiding containers from opposite directions along straight line paths of travel into the machine, a conveyor intermittently operable adjacent and transversely of said runways, a plurality of elongated pockets carried on said conveyor, adjacent pockets respectively receiving rows of containers simultaneously and in opposite directions from said runways, normally inactive fluid pressure means for imparting intermittent motion to said conveyor, container energized electric control means adjacent opposite sides of said conveyor at the leading ends of two adjacent pockets for actuating said fluid pressure means after said pockets are in registration with said runways and are each filled with rows of containers, said fluid pressure means intermittently advancing said conveyor a predetermined distance for bringing successive pockets into alignment with said electric control means to receive rows of containers into said successive pockets to form a layer of containers, and time delay means actuated by said fluid pressure means for stopping further advancement of said conveyor after the formation of a said layer of containers thereon.

4. A machine for feeding articles in parallel rows, the combination of a conveyor having fluid pressure means for intermittently moving the same along a path of travel, spaced parallel elongated pockets carried by said conveyor for receiving and holding rows of articles transversely of the conveyor's path, runways located on opposite sides of said conveyor, one runway terminating adjacent to and in alignment with a conveyor pocket when the conveyor is at rest and a runway on the opposite side of said conveyor terminating adjacent to and in alignment with the adjacent conveyor pocket, means for moving articles along said runways when so aligned to pass rows of articles into said pockets from opposite sides of said conveyor, and means operable by said conveyor moving means for preventing further advancement of the conveyor after a predetermined number of rows of articles has been received in and advanced by said conveyor pockets.

5. Apparatus for arranging articles in predetermined pattern formation for subsequent transfer as a unit layer, comprising a conveyor having a plurality of pairs of transverse troughs thereon and having normally stationary means for intermittently moving the conveyor, means on opposite sides of said conveyor for feeding articles in single line processions respectively into the troughs of each pair and in opposite directions when the conveyor is at rest, detector means on opposite sides of the conveyor engageable with the leading article in each of said troughs of a pair for actuating said moving means when the troughs of a pair are filled with adjacent rows of articles to advance said conveyor one step to progress the rows of articles thereon and to align a succeeding pair of troughs with said article feeding means, and control means actuated by said conveyor moving means to obtain a predetermined number of actuations of the latter to intermittently advance the conveyor and the successive article filled pairs of troughs thereon a plurality of steps, said control means being thereafter operable to render said conveyor moving means inoperable to further advance the conveyor when the successive rows of articles contained within and advanced by the pairs of conveyor troughs have assumed said predetermined pattern formation.

6. Apparatus for arranging articles in predetermined pattern formation on a movable conveyor for subsequent transfer as a unit layer therefrom, comprising a conveyor having a plurality of pairs of transverse troughs thereon and having normally stationary fluid pressure actuated means for intermmittently moving the conveyor, a pair of runways on opposite sides of said conveyor for feeding articles in single line processions respectively into the troughs of each pair and in opposite directions when the conveyor is at rest, means including a pair of detector switches and an electrically controlled valve connected in an electric circuit, said switches being engageable with the leading article in each of said troughs of a pair for actuating said valve to operate said fluid pressure means when the troughs of a pair are filled with adjacent rows of articles to advance said conveyor one step to progress the rows of articles thereon and to align a succeeding pair of troughs with said article feeding means, and electric control means including a holding circuit actuated by said fluid pressure means to obtain a predetermined number of actuations of the latter to intermittently advance the conveyor and the successive article filled pairs of troughs thereon a plurality of steps, said control means being thereafter again actuated by said fluid pressure means to render the latter inoperable to further advance the conveyor when the successive rows of articles contained within and advanced by the pairs of conveyor troughs have assumed said predetermined pattern formation.

7. In a machine for feeding articles such as containers or the like and for grouping them in a layer unit of a desired pattern, the combination of a plurality of container runways for guiding containers continuously from opposite directions into the machine, an intermittently movable conveyor disposed between said runways, a plurality of transverse troughs carried on said conveyor, adjoining ones of said troughs when aligned with said runways respectively receiving single rows of containers therefrom, means for intermittently moving said conveyor, electric switch means respectively carried by the machine frame on opposite sides of said conveyor adjacent the forward article receiving ends of said aligned conveyor troughs, said switch means being engageable and actuated by the leading containers in said adjacent rows thereof after their reception by said conveyor troughs for actuating said container moving means to move said conveyor intermittently to advance successive rows of containers received in said troughs, and means actuated by said conveyor moving means for stopping the intermittent movement of said conveyor after a predetermined number of rows of containers are received thereby to form a said layer unit.

8. In a machine for feeding articles in parallel rows, the combination of a conveyor having means for intermittently advancing the same along a straight path of travel, spaced parallel elongated pockets carried by said conveyor for receiving and holding rows of articles disposed transversely of the conveyor's path, a pair of runways located on opposite sides of said conveyor, a runway on one side of the conveyor terminating adjacent and in alignment with a said conveyor pocket and the runway on the opposite side of said conveyor terminating adjacent and in alignment with a succeeding conveyor pocket when the conveyor is at rest, auxiliary conveyor means for moving said articles along said runways when so aligned to pass adjacent rows of articles into and along the full length of the conveyor pockets from opposite sides of said conveyor, and detector means carried by the machine frame and respectively disposed adjacent the forward article receiving ends of adjoining conveyor pockets in alignment with the runways on opposite conveyor sides, said detector means being operatively connected to said conveyor advancing means to advance said conveyor one step after said adjoining pockets are filled with articles.

9. In a machine for feeding articles in parallel rows, the combination of a conveyor having means for intermittently advancing the same along a straight path of travel, spaced elongated pockets carried by said conveyor for receiving and holding adjacent rows of articles disposed transversely of the conveyor's path, runways located on opposite sides of said conveyor, said runways terminating adjacent and in alignment with adjoining conveyor pockets when the conveyor is at rest, means for moving articles along said runways when so aligned to pass rows of articles into adjacent conveyor pockets from opposite sides of said conveyor, electrical detector means carried by the machine frame and respectively disposed in alignment with said runways adjacent the forward article receiving ends of adjoining conveyor pockets on opposite sides of said conveyor, said detector means being respectively engaged and energized by the leading articles of adjacent rows thereof when received in said adjoining conveyor pockets for actuating said conveyor advancing means to institute a conveyor movement only when both of said adjoining conveyor pockets are filled with the rows of articles, and means actuated by said conveyor advancing means for stopping further advance of the conveyor after a predetermined number of article rows are received thereon.

JOHN E. SOCKE.

References Cited in the file of this patent

UNITED STATES PATENTS

| Number | Name | Date |
|---|---|---|
| 1,142,025 | Christoe | June 8, 1915 |
| 1,243,408 | Hawthorne | Oct. 16, 1917 |
| 1,492,864 | Straight | May 6, 1924 |
| 1,549,963 | Byerlein | Aug. 18, 1925 |
| 1,764,153 | Cramer | June 17, 1930 |
| 1,978,780 | Beon | Oct. 30, 1934 |
| 1,990,745 | Moore et al. | Feb. 12, 1935 |
| 2,217,982 | Heil | Oct. 15, 1940 |
| 2,244,803 | Rhode | June 10, 1941 |